(12) United States Patent
van de Hazel et al.

(10) Patent No.: US 7,195,114 B2
(45) Date of Patent: Mar. 27, 2007

(54) TRANSFER UNITS

(75) Inventors: Brand van de Hazel, Putten (NL); Sven Schuurman, Veenendaal (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 11/206,290

(22) Filed: Aug. 18, 2005

(65) Prior Publication Data

US 2006/0037840 A1 Feb. 23, 2006

(30) Foreign Application Priority Data

Aug. 18, 2004 (EP) .................................. 04077337

(51) Int. Cl.
*B65G 47/04* (2006.01)
(52) U.S. Cl. ........................ 198/803.14; 198/803.15; 198/867.12
(58) Field of Classification Search ........... 198/867.01, 198/867.08, 867.11, 867.12, 867.14, 867.15, 198/803.2, 803.14, 803.15
See application file for complete search history.

(56) References Cited

U.S. PATENT DOCUMENTS 2,989,168 A * 6/1961 Mumma ................ 198/803.15
4,015,704 A * 4/1977 Warren .................. 198/803.14
5,996,768 A * 12/1999 Boyce et al. .......... 198/867.12

FOREIGN PATENT DOCUMENTS

| EP | 0 560 458 | 9/1993 |
| EP | 1 057 728 | 12/2000 |
| EP | 1 310 429 | 5/2003 |

OTHER PUBLICATIONS

Company brochure, "Moba Mopack Farmpackers, In-line egg packing with Moba's Gentle Touch", 1976.

* cited by examiner

*Primary Examiner*—James R. Bidwell
(74) *Attorney, Agent, or Firm*—Stites & Harbison PLLC; Marvin Petry

(57) ABSTRACT

An apparatus for transferring products, in particular eggs, comprising at at least one height, positioned under an endless sorting conveyor, at least one row of conveying units, wherein the products are discharged in a well-defined manner from the sorting conveyor into the conveying units, are received by the conveying units, and are subsequently delivered to a packaging device thereunder, while each conveying unit is provided with at least a first and a second part which can move relative to each other, in particular away from each other and back again, from a receiving position for taking up such a product to a discharge position for delivering the product downwardly therefrom, wherein the said at least one row is included in a frame, while the at least one row is removeably and interlockably arranged in the frame.

8 Claims, 4 Drawing Sheets

TRANSFER UNITS

Figure 1:
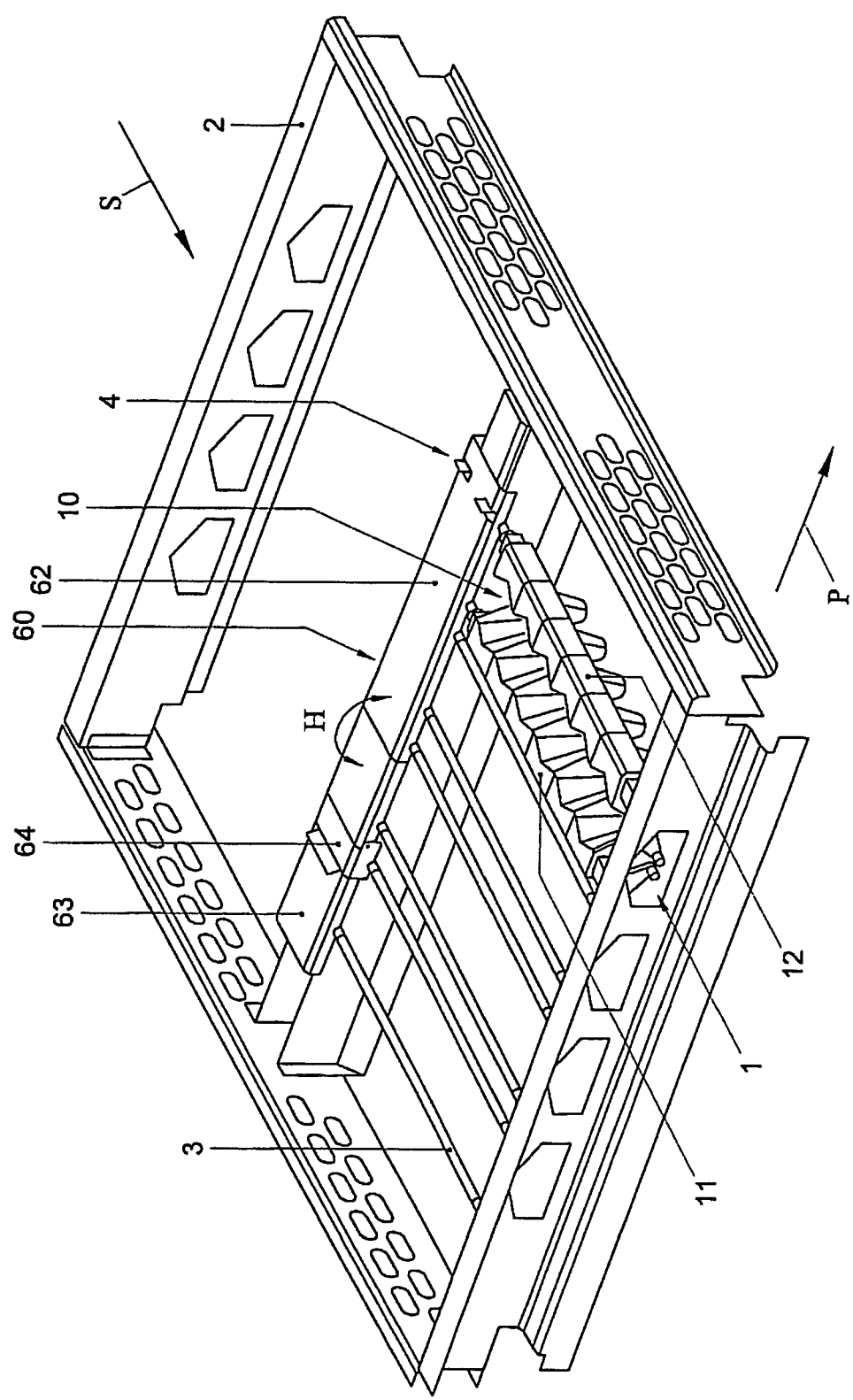

The present invention relates to an apparatus for transferring products, in particular eggs, having at least one row of conveying units positioned under an endless sorting conveyor, wherein the products are discharged in a well-defined manner from the sorting conveyor into the conveying units, are received by the conveying units, and are subsequently delivered to a packaging device thereunder.

Such an apparatus is generally known from the art of egg sorting machines, for instance from the so-called farmpackers as manufactured since 1976 by the Dutch firm of MOBA under the name of MOPACK (www.moba.nl). More particularly, the invention concerns that part of such a machine where the eggs are transferred from the main conveyor into a packaging device, such as a packaging box or an egg tray, typically referred to as 'dropset'.

Such an apparatus is also disclosed in EP560458. More particularly, this apparatus is included in a sorting system capable of sorting very large amounts of eggs, up to as many as 120,000 eggs an hour. The portion where the transfer from sorting conveyor to packaging device takes place comprises essentially three heights or levels and consists, in succession, of an upper system of four juxtaposed rows, a second level thereunder, with an endless horizontal buffer conveyor with eleven circulating rows, and thereunder a lower level with one row. These levels are also referred to as 'receiverset', 'bufferset', and, again, 'dropset'.

EP1057728 shows a system comparable to the above system, with the buffer units positioned in a vertical frame instead of in a horizontal buffer conveyor.

In EP1310429, in a similar system, for instance as represented in FIG. 6, there are utilized two highest levels with rows, a horizontal conveyor thereunder, and thereunder one delivery row.

In such machines, with which per unit time large quantities of food products, more particularly natural products such as eggs, or also fruit, are sorted, it almost goes without saying that contamination occurs. In the case of eggs, this involves dirt on the shell, but also egg contents due to leakage upon breakage. Such fouling constitutes a source liable to transmit all kinds of germs. For that reason, in this sector, more and more attention is being given to the cleaning of these machines. The most common procedure to date is for these and other parts of the machines to be hosed down with suitable detergents, or for the above-mentioned parts of such rows to be individually disassembled and cleaned.

To improve such a laborious procedure, the apparatus according to the invention is characterized in that said at least one row is included in a frame and is removeably and interlockably arranged in the frame.

Such an interlockable removeability not only provides the advantage that it considerably simplifies cleaning, for instance by placing such a row in a washing machine, but also makes it possible to remedy defects rapidly. Exchange for a same, identical row then requires neither knowledge nor time and can be carried out directly by the local user himself.

In an exemplary embodiment of the invention, from a said row of conveying units the first parts can be mounted on a first carrier and the second parts can be mounted on a second carrier, wherein, for the purpose of making removeable said one row, the carriers can be arranged in the frame in a removeable and interlockable manner, the carriers each being provided with an interlock at the ends thereof.

In a further embodiment of the invention, the apparatus is characterized in that such a row can be comprised:

at an upper, first height, positioned immediately under an endless sorting conveyor, functioning as at least one receiving row of receiving units, whereby the products are discharged in a well-defined manner from the sorting conveyor into the receiving units and are received by these receiving units, with a receiving position for taking up such a product, and with a discharge position for delivering the product downwardly therefrom, at an at least second height thereunder, functioning as at least one intermediate row of buffer units for taking up, buffering, and in turn delivering such a product, with the buffer units being similar to the receiving units, for taking up the products from the receiving units and discharging the product downwardly in a well-defined manner, and/or at a further height under the at least second height, and positioned above a packaging device, functioning as at least one delivery row of delivery units, for taking up products from the buffer units and delivering the products in a well-defined manner into the packaging devices, with the delivery units being similar to the receiving units and the buffer units.

With great advantage, in such large sorting machines, rows can be exchanged or replaced, without this requiring further disassembly of parts of the frame. It will be clear that this increases the efficiency of such machines considerably.

The apparatus according to the invention is further characterized in that the carrier is a shaft, with, on one side, a shaft pin fitting into a shaft hole which forms part of the frame and with, on the other side, a shaft end resting in a substantially vertical supporting slot which extends in the direction of the shaft, which forms part of the frame and which is open at both ends, while on the frame a locking slide is arranged with a slide surface which is slideably movable perpendicular to the direction of the shaft, thereby abutting against at least one shaft end end surface part after the carrier has been mounted, and more particularly in that the locking slide comprises a second slide surface linking up with the slide surface mentioned and substantially perpendicular to the first surface, thereby closing off the supporting slot at the top side after the carrier has been mounted.

Thus, in a suitable manner, it is provided that rapid removal and subsequently replacement, exchange or cleaning can be carried out.

A further exemplary embodiment of the apparatus according to the invention is characterized in that on the one side, the locking slide is further provided with at least one pin or edge extending from the first or second slide surface and that on the other side, the frame is provided with an lockable cover body with, accordingly, at least one opening fitting tightly over the pin or edge after the carrier has been mounted, and further in that the cover body comprises an elongated cover plate which, in the perpendicular direction mentioned, appropriately fits over the pin or edge after the carrier has been mounted, more particularly that the cover plate comprises two transversely hinged plate parts, a first plate part being hingedly connected to the frame by a cross shaft while the plate parts can hinge against each other only by the sides lying over the pin or edge, while the remote end of the second plate part can be locked to the frame by means of an interlock.

In this manner, an additional locking is provided, resulting in that the sorting machine as a whole functions highly reliably since loosening of the interlock by vibration and hence undesired displacement of such conveying or transferring units becomes impossible. The cover plate also offers a screen against pollution of the frame parts located thereunder in case broken eggs or severely damaged eggs end up in the transferring units.

Figure 2:
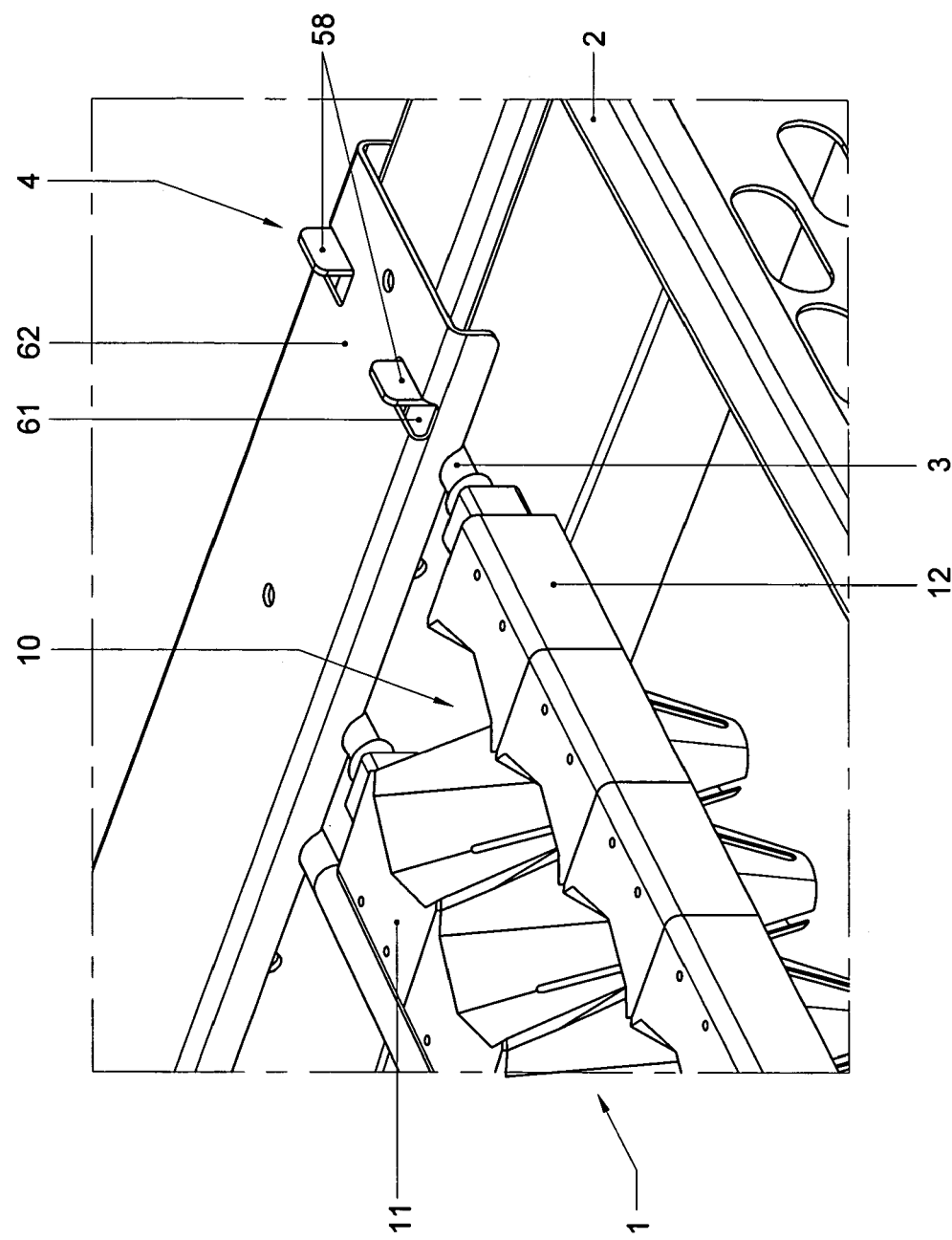
Figure 3:
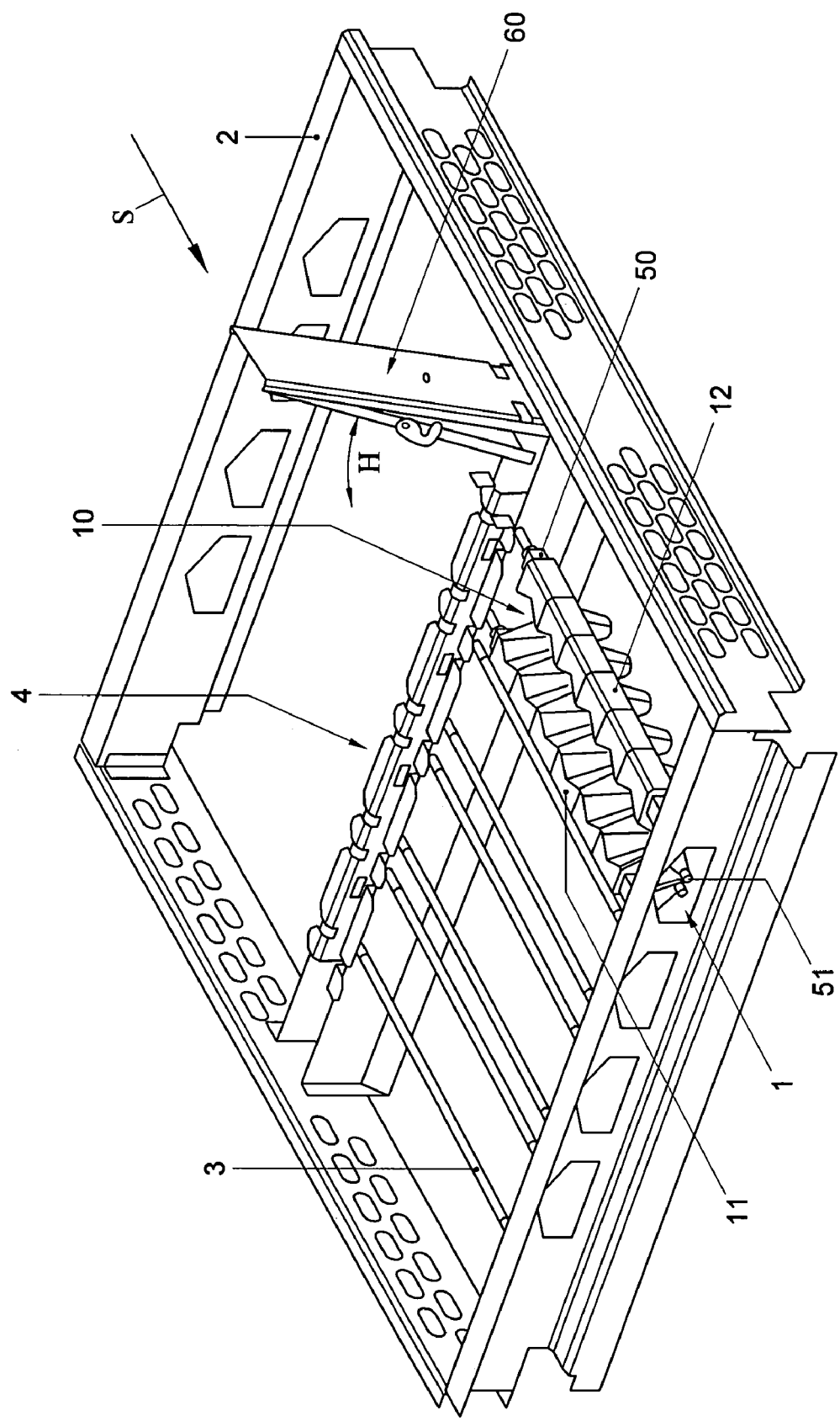

Further details of the apparatus according to the invention will be discussed with reference to a drawing. In the drawing FIG. 1 presents an isometric view of a frame with represented therein one doubly locked row according to the invention, FIG. 2 presents a detail of FIG. 1, in particular of the interlock, FIG. 3 presents an isometric view of a frame having therein one single locked row according to the invention, and FIG. 4 shows a detail of FIG. 3.

The same numerals in the different Figures designate the same or similar parts or constituents.

FIG. 1 schematically shows, in an isometric view taken obliquely from above, a row 1 of conveying or transferring units 10, arranged in a frame 2. The conveying or transferring units 10 each consist of two parts 11, 12 which, in the position shown, each form a nest for a product, for instance an egg. Arrow S above this row indicates the direction in which the eggs are conveyed by a sorting conveyor. It is generally known, for instance from EP 560458, that the eggs are conveyed with grippers and upon sorting are discharged at certain locations. These locations are situated above the packaging devices which generally run in a direction following arrow P under these sorting apparatuses. In order to arrange for proper guidance upon transfer of the products, as eggs here, the above well-known rows are positioned between the sorting conveyor and the packaging devices, thus functioning as intermediate station and transfer guide. The above-mentioned parts 11, 12 are represented in FIG. 1 in a closed position, that is, the position when receiving the eggs. At relay and transfer of the eggs, these parts hinge to open, moving slightly apart, whereby the eggs are discharged and released and fall to positions in the packaging devices placed thereunder. The conveying or transferring units 10 form a row 1, the parts 11 and 12 each mounted on a carrier 3. Each carrier with parts 11, 12 attached thereon is interlocked at each of its ends with an interlock 4. In FIG. 1, this is closed.

Figure 4:
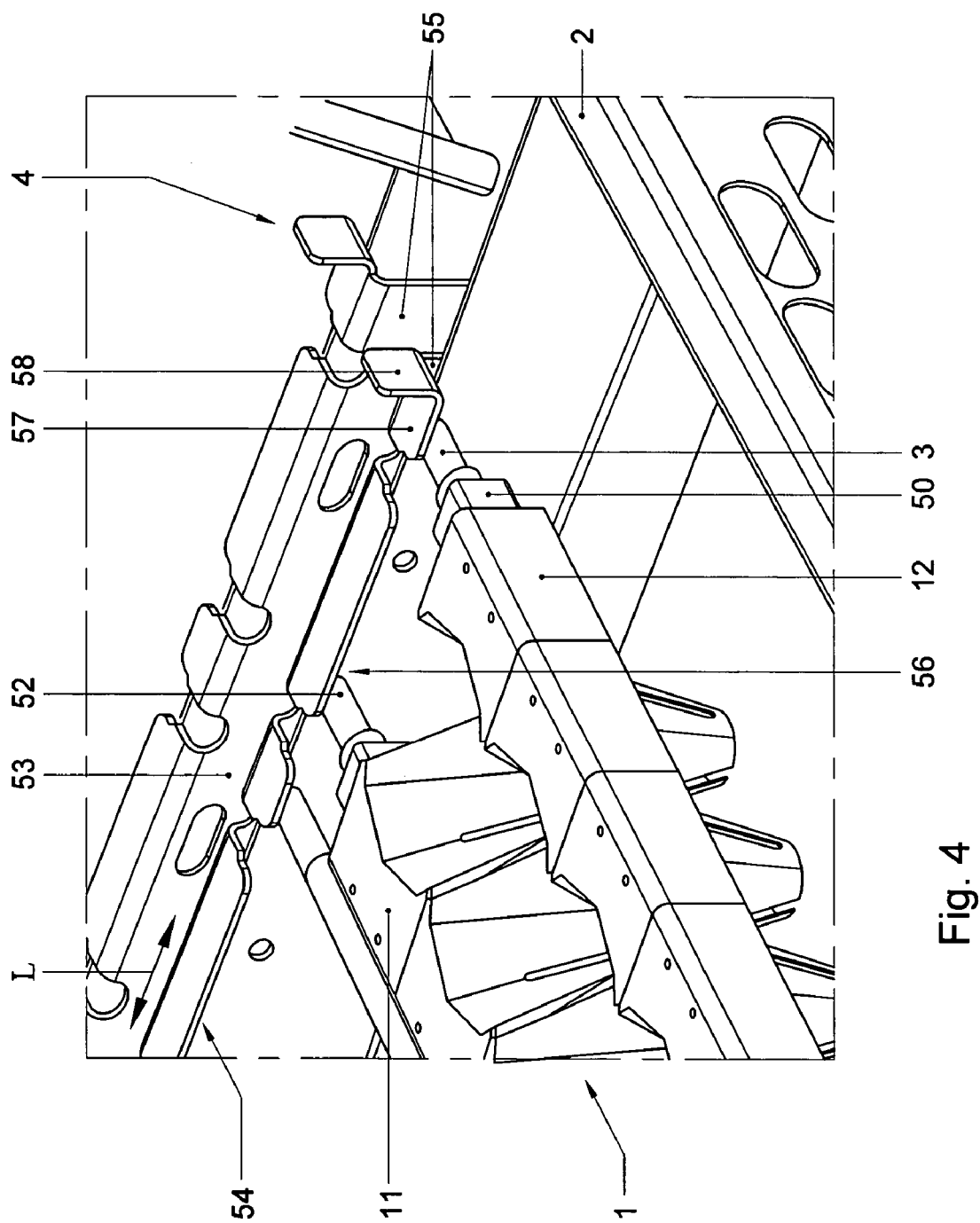

FIG. 4 further shows how the parts 11 and 12 are each attached to a bearing bush 50, the bush having a square external cross-section and a circular internal cross-section through which a shaft runs. In the exemplary embodiment represented, the shaft is considered as carrier 3. On one of the ends of this bearing bush, a coupling 51 provides for the parts 11 and 12 which are attached to the bush or can even form a whole with it, to be opened and closed. This coupling is for instance a mechanical flip-flop.

A frame 2 as depicted forms a part of a sorting machine which is generally considered to comprise the above sorting conveyor, the packaging devices thereunder, and machine parts in between of which such a frame typically forms part. The frame 2 according to the present invention often forms a so-called receiverset for receiving discharged eggs from the sorting conveyor and transferring the eggs downwardly from this receiverset to, for instance, a bufferset. Such a frame is typically designed as a slideable drawer, that is, slideable perpendicular to the conveying direction S.

FIG. 3 shows a similar situation as FIG. 1, here however the interlock is partly open, while a cover body 60 is hinged-in along the direction H while in FIG. 1, conversely, it is hinged-out, or also, shut. The operation hereof will be elucidated hereinbelow.

In FIGS. 2 and 4, a similar detail from FIGS. 1 and 3, respectively, is shown in enlarged representation. The interlock 4, at least the main part thereof is represented in this part of the frame while the (in the Figures) nearer end of the shaft 3 projects with a shaft pin into a shaft hole, or shaft bush, and is not shown. More particularly, shaft end 52 fits with shaft end end surface 56 into a substantially vertical support slot 53. A locking slide 54 is slideable and movable in arrow direction L along said end surface part 56 while thus, displacement of the carrier or shaft 3 through the slot 53 in the direction of the shaft is blocked and locked. In its simplest form, a vertical slide surface 55 could suffice. In order to also prevent tipping up vertically, further, a second substantially horizontal slide surface 57 is provided, closing off the top side of the slot 53 further.

In all Figures, it is clear that there are several shafts 3. Therefore, the slide 53 is an elongated machine part simultaneously interlocking all shafts. Further, the slide 53 is provided with an upstanding edge 58 with which the slide can be slid in or pulled out.

As already indicated in the introduction, the interlock can be double, more particularly so by also, in turn, locking this locking slide 54. To that end, a cover body 60 can be placed in a tight fitting manner over the locking slide 54 and then be secured by an interlock 64. Although many manners of placing and locking are possible, in this exemplary embodiment, a cover body is used that can hinge at two locations, i.e. for the first plate part 62 near the attaching shaft to the frame and, subsequently, at the transition to a second plate part 63, while hinging is possible in only one manner as shown in, in particular, FIG. 3. To lock the locking slide 54 in the proper position, openings 61 are provided in the cover body such that the upstanding edges 58 mentioned can only protrude through the openings when the locking slide is in the proper locking position.

It will be clear to each skilled person that small modifications are possible without departing from the scope of protection of the claims.

The invention claimed is:

1. An apparatus for transferring products, in particular eggs, comprising at least one row of transferring units positioned at at least one height under a conveying direction of an endless sorting conveyor, wherein products which are discharged in a well-defined manner from the conveyor direction into the at least one row of transferring units are received by the at least one row of transferring units, and are subsequently delivered downwardly to a packaging direction of a packaging device thereunder, the at least one row of transferring units including at least a first and a second part which can move away from each other and back again, from a receiving position for taking up such a product to a discharge position for delivering the product downwardly through the at least one row, and a frame which is stationary relative to the conveying and packaging directions and in which said at least one row of transferring units is selectively arranged to be interlocked with the frame or removable from the frame.

2. An apparatus according to claim 1, further including a first carrier on which the first part is mounted and a second carrier on which the second part is mounted, each said carrier having ends provided with an interlock which engages the frame and which is removable from the frame.

3. An apparatus according to claim 1, wherein the at least one row is located:

at an upper, first height, positioned immediately under the endless sorting conveyor and with the at least one row of transferring units functioning as at least one receiving row of receiving units, whereby the products are discharged in a well-defined manner from the sorting conveyor into the receiving units and are received by these receiving units, with the receiving position for taking up such a product, and with the discharge position for delivering the product downwardly therefrom, or at a second height under the first height, and with the at least one row of transferring units functioning as at least one intermediate row of buffer units for taking up, buffering and in turn delivering the products, with the buffer units being similar to the receiving units, for taking up the products from the receiving units and discharging the products downwardly in a well-defined manner, or at a third height under said second height, and positioned above the packaging device, and with the at least one row of transferring units functioning as at least one delivery row of delivery units, for taking up products from the buffer units and delivering the products in a well-defined manner to the packaging devices, with the delivery units being similar to the receiving units and the buffer units.

4. An apparatus according to claim 2, wherein each carrier is a shaft with, (a) on one side, a shaft pin fitting into a shaft hole in the frame and, (b) on the other side, a shaft end resting in a substantially vertical supporting slot which extends in the direction of the shaft, which forms part of the frame and which is open on both ends, and further including a locking slide on the frame having a slide surface which is slideably movable perpendicular to the direction of the shaft, thereby abutting against an end surface of each shaft end after the carrier has been mounted to the frame.

5. An apparatus according to claim 4, wherein the locking slide comprises a second slide surface linking up with the first-mentioned slide surface and substantially perpendicular to the first surface, thereby closing off the supporting slot at a top side thereof after the carrier has been mounted.

6. An apparatus according to claim 4, wherein on the one side, the locking slide is further provided with at least one member extending from the first or second slide surface, and on the other side, the frame is provided with a lockable cover body with, accordingly, at least one opening fitting tightly over the member after the carrier has been mounted.

7. An apparatus according to claim 6, wherein the cover body comprises an elongated cover plate which, perpendicular to the shaft, appropriately fits over the member when the carrier has been mounted.

8. An apparatus according to claim 7, wherein the cover plate comprises transversely hinged first and second plate parts, the first plate part being hingedly connected to the frame a by a cross shaft, the first and second plate parts being hinged to each other only by sides lying over the member, and the second plate part having a distal end which is locked to the frame by an interlock.

* * * * *